JOSEPH H. RAYNARD, OF LYNN, MASSACHUSETTS.

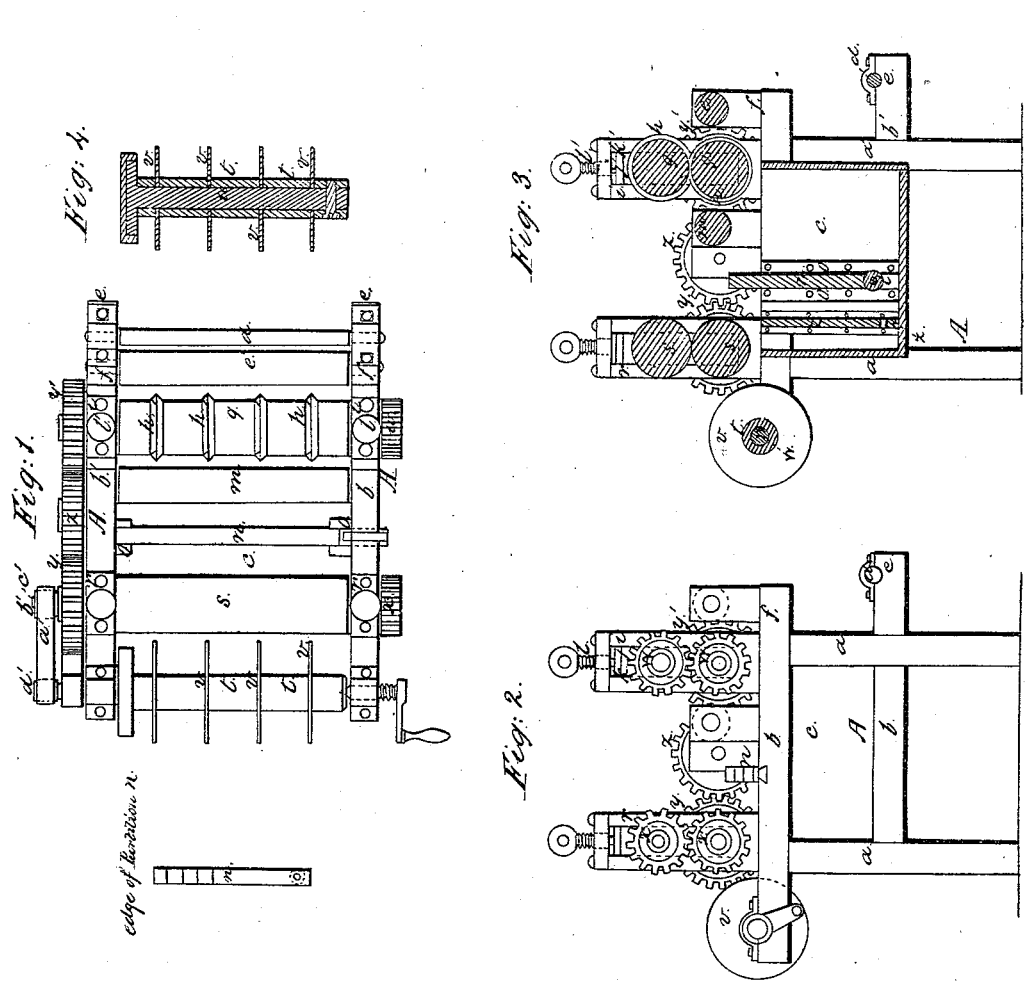
J. H. Raynard.
Making Parceling.
Nº 84,578. Patented Dec. 1, 1868.

*Letters Patent No. 84,578, dated December 1, 1868.*

MACHINE FOR MANUFACTURING PARCELLING.

The Schedule referred to in these Letters Patent and making part of the same.

*To all to whom these presents shall come:*

Be it known that I, JOSEPH H. RAYNARD, of Lynn, in the county of Essex, and State of Massachusetts, have invented a new and useful Machine for Manufacturing "Parcelling," as it is termed; and do hereby declare the following to be a full, clear, and exact description thereof, due reference being had to the accompanying drawings, making part of this specification, and in which—

Figure 1 is a plan,

Figure 2, a side elevation,

Figure 3, a vertical central and longitudinal section of a machine constructed in accordance with my invention.

The object sought in producing the machine forming the subject of my present application for Letters Patent is to prepare, in suitable quantities for the market, the material known among nautical men as parcelling, and used as covering for ropes in the "rigging" of navigable vessels, as well as for covering seams, and for other purposes, such material, which consists of strips of canvas, covered or coated with tar, having been heretofore made only by hand, and in small quantities, in a laborious manner, and at the time when needed for immediate use, and, as a consequence, often under great difficulties.

The invention in question consists in a suitably-constructed frame, carrying, in addition to a tank containing tar, or its equivalent, for covering or coating the canvas, means for cutting the canvas or other material into strips, for scraping the excess of tar from such strips, and for subsequently winding the prepared strip or parcelling into rolls, for transportation, storage, or use, the machine, as composed of these elements, being hereinafter described, and its operation explained.

The accompanying drawings illustrate the frame A of the machine, as composed of four uprights or posts, $a\ a\ a'\ a'$, and four horizontal rails, $b\ b\ b'\ b'$, the latter being disposed midway, or thereabouts, between the top rails $b\ b$ and the bottom of the posts $a'\ a'\ a\ a$, a tank, $c$, for containing tar, or an equivalent material, being disposed within the space enclosed between the said posts $a\ a\ a'\ a'$ and rails $b\ b\ b'\ b'$.

A roller or beam, $d$, for receiving the sheet or supply of canvas or material to be treated, is supported in brackets $e\ e$, projecting from about the middle of the posts $a\ a'$, at the forward end of the machine, and over this beam a roller, $e'$, is supported in brackets $f\ f$, also extending outward from the posts $a\ a'$.

The cutters for cutting the material into strips or bands are shown at $g\ g$, as composed of two twin cylinders, having formed upon their peripheries a series of annular-bevelled projections, $h\ h$, &c., the right-angular faces of which revolve in contact with each other, and serve to cut or sever the material into strips of the requisite width, these cylinders $g\ g$ being supported in standards, $i\ i'$, erected upon the top rails $b\ b'$ of the frame A, and over the posts $a\ a'$ thereof, the upper cylinder being applied to the standards by means of sliding or adjustable boxes, $j\ j$, moving in slots or apertures, $k\ k'$, made in such standards, and regulated by screws, $l\ l'$, in such manner as to allow of the regulation of the distance between the two cylinders.

Immediately in advance of the cylinders $g\ g$, and opposite and on a level with the roller $e'$, a second roller, $m$, is disposed, and so as to revolve in suitable boxes applied to the frame A, the top surface of the two rollers $e$ and $m$ being on a level, or thereabouts, with the upper surface of the lower cutting-cylinder $g$.

The tank or reservoir $c$ is divided, at or near its centre, by a transverse movable partition or gauge-board, $n$, supported in position within the tank by guides or ways, $o\ o$, and so as to be raised or lowered, as occasion or necessity dictates, according to the quantity of tar contained in the tank, the said partition being provided with a rack, or other suitable means of holding it at any desired altitude within the tank, and being further provided, at its bottom, with a roller, $p$, as represented, for allowing the strips of canvas to pass around it with as little friction as possible.

In rear of the partition $n$, and suitably connected to the frame A, is a scraper, composed of two vertical plates, $q\ q$, through which the canvas, as it emerges from the tar-bath, passes, and which scrapes from its surface the excess of tar adhering thereto.

Furthermore, in rear of this scraper, and over the rear posts $a\ a'$, and supported in standards, $r\ r$, similar to the standards $i\ i'$, and, like them, provided with sliding boxes and adjustable screws, are two pressure and draught-rollers, $s\ s$, on a level, or thereabout, with the cutting-cylinders $g\ g$, the material or strips, after having been coated with tar and passed through the scrapers $q\ q$, being fed along by the said rollers $s\ s$, which also press and roll back from the material any excess of tar which the scrapers may not have removed.

The bobbin or reels for receiving the prepared strips are shown at $t\ t$, &c., as applied to a shaft, $u$, and in manner as shown in Figure 4 of the drawings, which is a longitudinal section of such shaft and bobbin.

In this figure, it will be seen that the bobbin or reels are composed of separate cylinders or thimbles, passed upon the shaft $u$ to the desired number, and with a series of disks or washers, $v\ v$, &c., interposed between them, to control and regulate the proper winding of each strip, the shaft or drum itself being applied to the machine in any suitable manner, which will allow of its being readily withdrawn from or applied thereto.

The cutting-cylinders $g\ g$ are geared together at one end of the machine by spur-gears $w\ w$, while the pressure and draught-rollers $s\ s$ are connected in similar manner; and at the same end of the machine, by spur-gears, $x\ x$, of like size and equal number of teeth, as are also the gears $w\ w$.

The lower cutting-cylinder $g$ and the lower pressure-roller are provided, at the opposite end of the machine, with spur-gears, $y\ y'$, of equal size and number of teeth, and meshing into them is an intermediate spur-gear, $z$, of like construction, by which means a rotation of either of the other gears, $y\ y'$, in one direction, will cause a corresponding simultaneous rotation of the lower cutting-cylinder and draught-roller, and a simultaneous rotation of the upper cutting-cylinder and roller in an opposite direction, the shaft $u$ and its bobbins being revolved by an endless belt, $a'$, travelling about a pulley, $b'$, fixed to one end of the journal $c'$ of the lower pressure-roller, and a second pulley, $d'$, fixed to the corresponding journal of the shaft $u$.

In operating with the above-described machine, a suitable quantity of canvas, or other material to be prepared, is to be wound upon the roller $d$, and the tank partially or nearly filled with tar, or its equivalent.

The end of this roll of material is then to be introduced between the cylinders $g\ g$, of which the pressure-screws $l\ l$ have partially been raised, and the material drawn a short distance beyond, without cutting it, and over the roller $m$.

The screws $l\ l'$ are to be depressed, and the cutters $h\ h$ forced in contact.

An auxiliary piece of canvas or "starter" is then to be sewed or otherwise secured to the canvas sheet, and with its free end held in the person's hand, the partition $n$ then laid upon it and forced downward until the roller $p$ of such partition, with the canvas below it, is immersed within the tar contained in the tank $c$.

The free end of the "starter" is then to be introduced between the draught-rollers, and it and the material drawn through the machine, until the strips cut by the cutting-cylinders having advanced to the bobbins before mentioned, about which they are wound by the rotation of the shaft $u$, the spaces between the washers $v\ v$ being equal, or about equal, to the width of the prepared strips, and the number of bobbins being equal to the number of strips cut by the cutting-cylinders.

After the supply of canvas upon the supply-roller $d$ has thus been cut into strips, passed through the machine, and received its coating of tar, and been wound upon the bobbins or thimbles $t\ t$, they are to be removed separately from the shaft $u$, and a new supply of thimbles substituted, the washers $v\ v$ being interposed between them, as at first.

The strips of prepared canvas or "parcelling" thus wound in rolls upon the thimbles are ready for transportation and use when wanted.

It may, in practice, be found desirable to apply heat, in any suitable manner, to the tank $c$, for the purpose of liquefying the tar contained therein.

It is the purpose, however, to prepare the material in warm weather, when this artificial heat will not be necessary.

It will be obvious that knives or cutters of any suitable construction may be employed in place of the cutting-cylinders hereinbefore described.

Furthermore, I do not confine myself to the plan of first cutting the canvas into strips, and afterwards coating it, as this operation may be reversed, and the material first coated and then cut into strips.

A pair of inclined rolls, or a spirally-fluted roller, or other analogous device, may be applied to the machine in advance of the cutters, for the purpose of preventing "bagging" or wrinkling of the material.

I would remark that I have contemplated applying one or more heated rollers, in place of the roller $e'$, for the purpose of expelling any moisture or dampness contained in the canvas, as is often the case when old sails are used.

I claim as my invention, and desire to secure by Letters Patent of the United States of America—

1. In the manufacture of parcelling or tarred-canvas covering for ropes, seams, &c., in vessels, the employment of a machine, substantially as herein described; that is to say, consisting of cutting and drawing and pressure-rolls, in combination with an interposed tank for the tar in which the material is immersed, and bobbins or spools upon which the prepared canvas is wound in rolls, the said parts being constructed and arranged for joint operation, as shown and set forth.

2. The combination of the tank $c$ and slide $n$, constructed as described, with the pressure and cutting-rolls, in the manner and for the purposes specified.

Witnesses:        JOSEPH H. RAYNARD.
  C. H. GRIFFIN,
  ALEXANDER BLACK.